United States Patent [19]
Kunz

[11] Patent Number: 6,050,573
[45] Date of Patent: Apr. 18, 2000

[54] AUTOMATIC LEVELING SYSTEM FOR VEHICLES

[75] Inventor: James R. Kunz, Eugene, Oreg.

[73] Assignee: Kwikee Products Co., Inc., Cottage Grove, Oreg.

[21] Appl. No.: 09/164,229

[22] Filed: Sep. 30, 1998

[51] Int. Cl.⁷ ........................................................ B60S 9/00
[52] U.S. Cl. .................................. 280/6.153; 280/763.1; 254/45; 254/89 R
[58] Field of Search ............................. 280/763.1, 765.1, 280/6.153; 254/45, 93 R, 89 H

[56] References Cited

U.S. PATENT DOCUMENTS

| | | |
|---|---|---|
| 3,404,899 | 10/1968 | Vogel . |
| 3,669,409 | 6/1972 | Eranosian . |
| 3,680,878 | 8/1972 | Beck . |
| 3,767,226 | 10/1973 | Stephens . |
| 3,817,493 | 6/1974 | Hanser . |
| 3,857,582 | 12/1974 | Hartog . |
| 3,885,813 | 5/1975 | Kern . |
| 3,901,532 | 8/1975 | Hornagold . |
| 4,044,999 | 8/1977 | Dodgen . |
| 4,053,073 | 10/1977 | Franchin . |
| 4,061,309 | 12/1977 | Hanser . |
| 4,067,543 | 1/1978 | Orth et al. . |
| 4,071,147 | 1/1978 | Hornagold . |
| 4,082,249 | 4/1978 | Valdespino et al. . |
| 4,084,830 | 4/1978 | Daniel, Jr. et al. . |
| 4,165,861 | 8/1979 | Hanser . |
| 4,174,094 | 11/1979 | Valdespino et al. . |
| 4,216,939 | 8/1980 | Valdespino . |
| 4,541,843 | 9/1985 | Morrisroe, Jr. ........................ 280/6.153 |
| 4,597,584 | 7/1986 | Hanser . |
| 4,641,843 | 2/1987 | Morrisroe, Jr. . |
| 4,733,876 | 3/1988 | Heider et al. ......................... 280/6.153 |
| 4,743,037 | 5/1988 | Hanser . |
| 4,746,133 | 5/1988 | Hanser et al. . |
| 4,784,400 | 11/1988 | Hofius . |
| 4,815,711 | 3/1989 | Bruno et al. . |
| 4,863,184 | 9/1989 | Mena . |
| 4,865,295 | 9/1989 | Holloway . |
| 4,887,840 | 12/1989 | Harara et al. . |
| 4,974,861 | 12/1990 | Itoh et al. . |
| 5,013,011 | 5/1991 | Halloway . |
| 5,143,386 | 9/1992 | Uriarte . |
| 5,159,989 | 11/1992 | Claxton . |
| 5,176,391 | 1/1993 | Schneider et al. . |
| 5,188,379 | 2/1993 | Krause et al. . |
| 5,258,913 | 11/1993 | Baldauf . |
| 5,295,430 | 3/1994 | Dewald, Jr. et al. . |
| 5,299,829 | 4/1994 | Rivers, Jr. et al. . |

(List continued on next page.)

FOREIGN PATENT DOCUMENTS

| | | |
|---|---|---|
| 222381 | 7/1959 | Australia . |
| 2423655 | 12/1979 | France ............................... 280/765.1 |
| 2640-206 | 6/1990 | France . |
| 1518-150 | 10/1989 | Russian Federation . |
| 1427224 | 3/1976 | United Kingdom ................. 280/763.1 |

*Primary Examiner*—Brian L. Johnson
*Assistant Examiner*—G B Klebe
*Attorney, Agent, or Firm*—Christensen O'Connor Johnson & Kindness PLLC

[57] ABSTRACT

An automatic leveling system for a vehicle includes four leveling jacks coupled to a vehicle and extendible into contact with the ground to stabilize the vehicle. A level sensor calculates the location of a plane defined by the chassis of the vehicle, and downloads the information regarding the location of the plane to an onboard computer. The computer calculates the difference between the present location of the chassis plane and a plane which is level. The computer determines which of the leveling jacks need to be extended, and the proportion of extension required by each jack to activate the jacks in unison to level the vehicle. The computer further determines the proportions of flow that are needed to actuate the jacks in unison. To achieve the desired proportional flow, solenoid valves in a manifold coupling the jacks to a source of fluid are operated at varying frequencies. The selected frequencies are determined by the computer and correspond to the percentage of extension required by each of the four jacks to move the chassis plane to a level position.

10 Claims, 4 Drawing Sheets

U.S. PATENT DOCUMENTS

| | | | |
|---|---|---|---|
| 5,312,119 | 5/1994 | Schneider et al. | 280/765.1 |
| 5,474,330 | 12/1995 | Meehleder . | |
| 5,580,095 | 12/1996 | Fukumoto . | |
| 5,676,385 | 10/1997 | Schneider et al. . | |
| 5,901,980 | 5/1999 | Few et al. | 280/763.1 |
| 5,915,700 | 6/1999 | Schneider et al. | 280/6.153 |

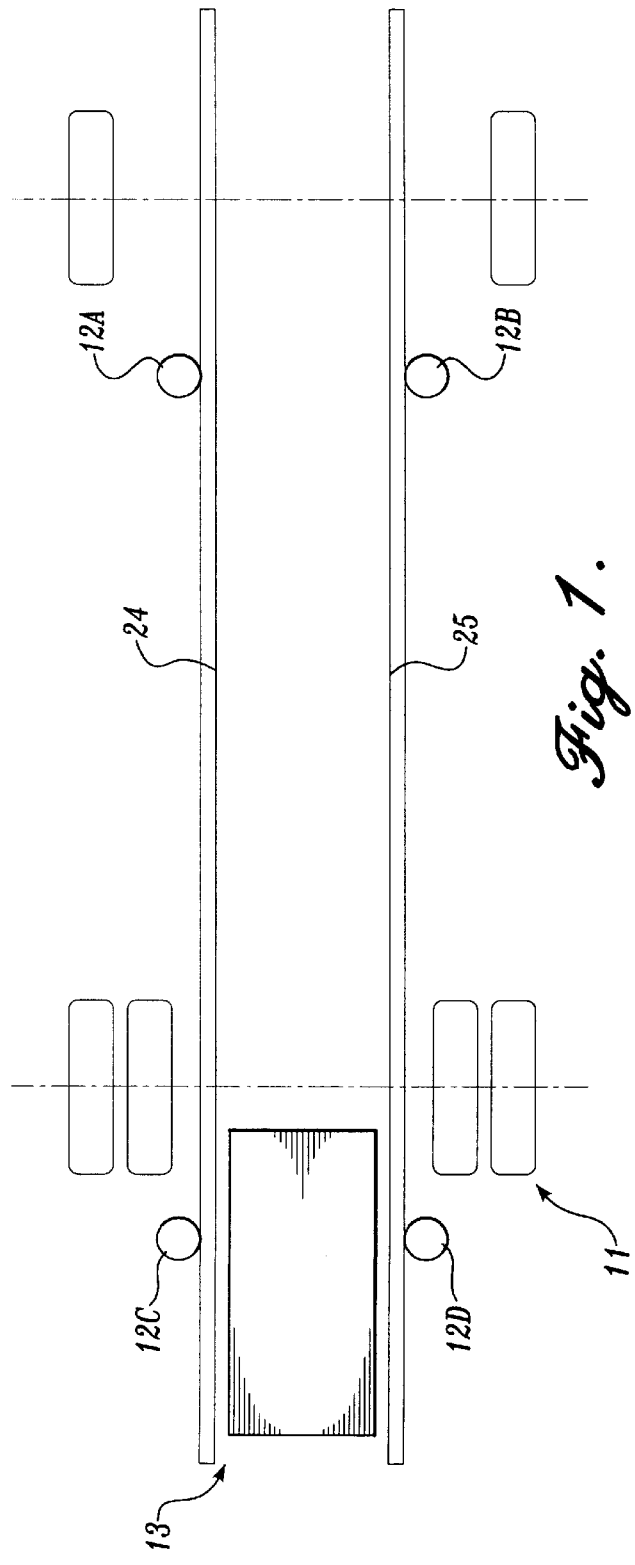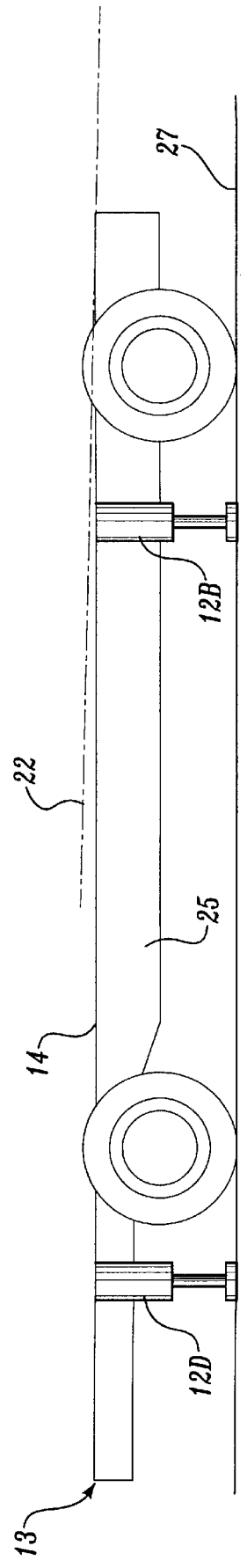

AUTOMATIC LEVELING SYSTEM FOR VEHICLES

FIELD OF THE INVENTION

This invention relates to a method and apparatus for automatically leveling a vehicle, for example, a recreational vehicle.

BACKGROUND OF THE INVENTION

Recreational vehicles (RVs), such as motor homes, are frequently parked for use on sites that are not level. It is desirable to level the RV prior to use, so that the living quarters are stable and comfortable.

Several conventional systems exist for leveling an RV. Such conventional systems typically include four jacks coupled to the underside of the vehicle in spaced relation to each other. The leveling jacks are typically hydraulically or electrically actuated, and are individually operated, either manually or automatically. Such conventional systems typically include a level module having a sensor associated with each jack, and the user operates control buttons or levers to extend each of the four jacks individually in an attempt to level the RV. This process is very often timeconsuming and frustrating for the user. Although some currently available systems activate the jacks in pairs, the leveling process is still time-consuming.

Accordingly, there is a need in the art for an improved system for leveling a vehicle, and in particular, for a system that automatically and quickly levels a vehicle, such as a recreational vehicle. The present invention fulfills these needs, and provides further related advantages.

SUMMARY OF THE INVENTION

Briefly, the present invention provides an improved method and apparatus for automatically leveling a vehicle. Although a variety of vehicles may be leveled in accordance with the present invention, in a preferred embodiment, the present invention is designed to level a recreational vehicle, for example, a motor home.

In a preferred embodiment, four hydraulic jacks are coupled to the vehicle chassis, a first pair of jacks being longitudinally spaced on a first frame rail and a second pair of jacks being longitudinally spaced on a second frame rail. The jacks are coupled to a pump via a manifold assembly that has solenoid valves that control the rate of fluid flow from the pump to each of the hydraulic jacks. The solenoid valves are electronically coupled to a motor/pump controller and to a digital level sensor that are integrally mounted in a control panel having a central processing unit (CPU).

During installation of the system, the vehicle chassis is leveled manually, using any conventional means, for example, a level. Once the vehicle chassis is level in a horizontal x-y plane, the position of the chassis plane defined by the location of the frame rails is inputted into the CPU as a "zero" or benchmark value.

In operation of the system, all four jacks are extended so as to be in contact with the ground to initially stabilize the vehicle. This condition is recognized by the system by a rise in the hydraulic manifold pressure. The digital level sensor (for example, a tilt sensor having a digital output) calculates the chassis plane of the vehicle and downloads this information to the control panel computer or CPU. The computer uses this information to calculate the difference between the present position of the chassis and the level, zero condition. The computer determines which jack(s) need to be extended, as well as the amount of extension required to level the vehicle. The computer and motor/pump controller output a series of digital control signals, which drive the pump and manifold solenoid valves. The jacks are adjusted simultaneously by varying the rate of flow of hydraulic fluid to the cylinders in proportion to that determined to be needed to level the vehicle. In this manner, the jacks to be adjusted move at different, selected rates for a single, common period of time. To achieve proportional flow, the solenoid valves are operated at varying frequencies that correspond to the percentage of extension required for each of the jacks. By adjusting the jacks simultaneously and proportionally, torque on the vehicle chassis is minimized, and the time required to level the vehicle is minimized. In a preferred embodiment, the solenoid valves are actuated at a relatively low frequency, for example, 4–10 cycles per second. Furthermore, the solenoid valves are fully opened and fully closed during each cycle to help prevent the creation of a resonant frequency between the movement of the solenoid valve and the signal provided to the valve.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a top plan view of a portion of the system provided in accordance with a preferred embodiment of the present invention, shown mounted on a schematic illustration of a vehicle;

FIG. 2 is a side elevational view of a portion of the system illustrated in FIG. 1;

DETAILED DESCRIPTION OF THE PREFERRED EMBODIMENT

Figure 3:
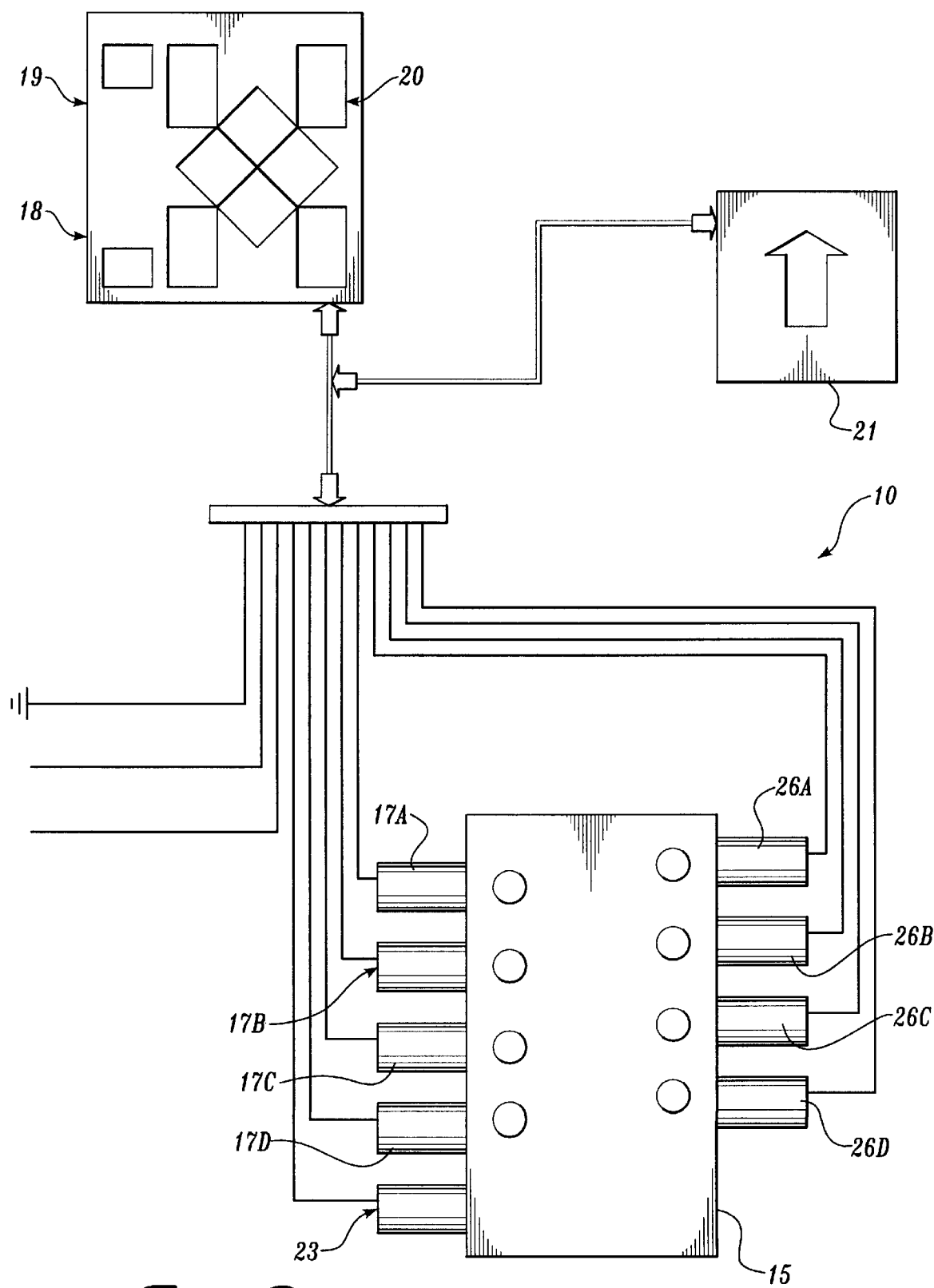
FIG. 3 is a schematic illustration of electrical connections between portions of a system provided in accordance with a preferred embodiment of the present invention.

An improved system for automatically leveling a vehicle, such as a recreational vehicle, is provided in accordance with a preferred embodiment of the present invention. As illustrated in FIGS. 1 and 2, the system 10 includes four leveling jacks 12A, B, C, D (collectively referred to hereinafter as leveling jacks 12), coupled to a chassis 13 of a vehicle 11. The leveling jacks 12 are hydraulically actuated. Although any conventional, hydraulic leveling jack may be used, in a preferred embodiment, Kwikee Products Company, Inc.'s Level Best® 2000 jacks are used.

Figure 4:
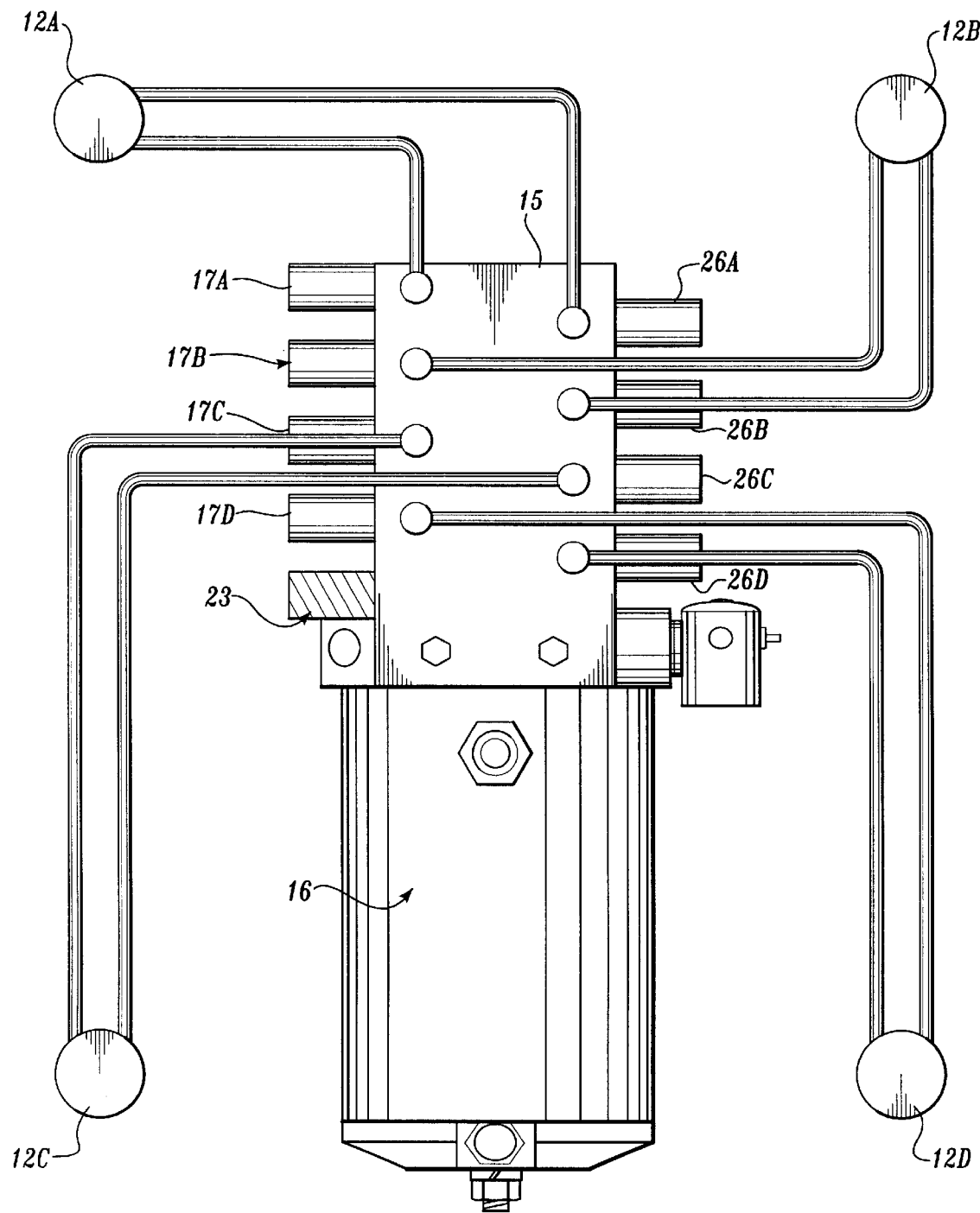
FIG. 4 is a schematic illustration of hydraulic circuits of a system provided in accordance with a preferred embodiment of the present invention.

As seen in FIG. 4, the system 10 further includes a manifold 15 that couples the leveling jacks 12 in fluid communication with a pump 16 which in turn is in fluid communication with a source of fluid. More particularly, the manifold 15 has a plurality of solenoid valves 17A, B, C, D that selectively allow fluid to flow from the manifold 15 to the leveling jacks 12 to extend the jacks, and a plurality of solenoid valves 26A, B, C, D to selectively allow fluid to flow from the leveling jacks 12 to the manifold 15 when it is desired to retract the leveling jacks. The direction of flow is controlled using a valve 23 provided in the manifold. Although a variety of valves may be used, in a preferred embodiment, valves 17A, B, C, D and 26A, B, C, D are Deltrol® DSV-080 solenoid valves and valve 23 is a Deltrol® DSV2-080 solenoid valve.

As illustrated in FIG. 3, the solenoid valves are electronically coupled to an electronic motor/pump controller 18 and to a central processing unit (CPU) 19, both contained in control panel 20, and to a digital level sensor 21.

When the system is installed on a vehicle, the chassis 13 is manually leveled, using any conventional means, such as a level. When in this level condition, the frame rails 24, 25 of the vehicle define a level base plane 22, the location of which is programmed into the digital level sensor to be used as a benchmark.

In operation, the user initiates the leveling sequence by pushing appropriately marked buttons or switches on the control panel 20. The CPU 19 sends electronic signals to extend all four jacks 12 until they are in contact with the ground 27 to initially stabilize the vehicle. The condition of all four jacks being in contact with the ground is recognized by a rise in the hydraulic manifold pressure, as is presently known in the art. After the initial stabilization process is complete, the digital level sensor 21 determines the location of the plane 14 defined by the vehicle chassis. The digital level sensor accomplishes this by determining the slope of the frame rails parallel and perpendicular to a longitudinal axis of the frame rails. The digital level sensor 21 downloads the information regarding the location of the chassis plane of the vehicle to the CPU 19.

Thereafter, the CPU calculates the distance between the present position of the chassis plane 14 and the benchmark values for the location of the level base plane 22. The CPU 19 then determines which of the leveling jacks 12 must be extended to level the vehicle, and the proportion of extension required by each jack to level the vehicle while adjusting the jacks simultaneously for a single time interval. To achieve substantially simultaneous actuation of the jacks, the CPU and electronic level sensor determine the relative proportions of flow of fluid that must go to each jack to move the jacks to their desired location in unison. To achieve the desired proportional flow, the CPU 19 calculates a frequency at which each of the appropriate solenoid valves must be actuated to provide the desired rate of flow to the associated jack 12. The calculated frequencies for the solenoid valves therefore correspond to the percentage of extension required by each of the four jacks to lift the chassis plane to the base level plane. The CPU and controller 18 output a series of digital signals which drive the solenoid valves at the determined frequencies. In a preferred embodiment, the solenoid valves are actuated at a relatively low frequency, for example, 4–10 cycles per second. This range of frequencies is sufficient to accommodate the percentage of extension required by the jacks. Further, the solenoid valves are configured to fully open and fully close during each cycle, to minimize the creation of a resonant frequency between the movement of the solenoid valve and the signal provided to the valve.

Figure 5:
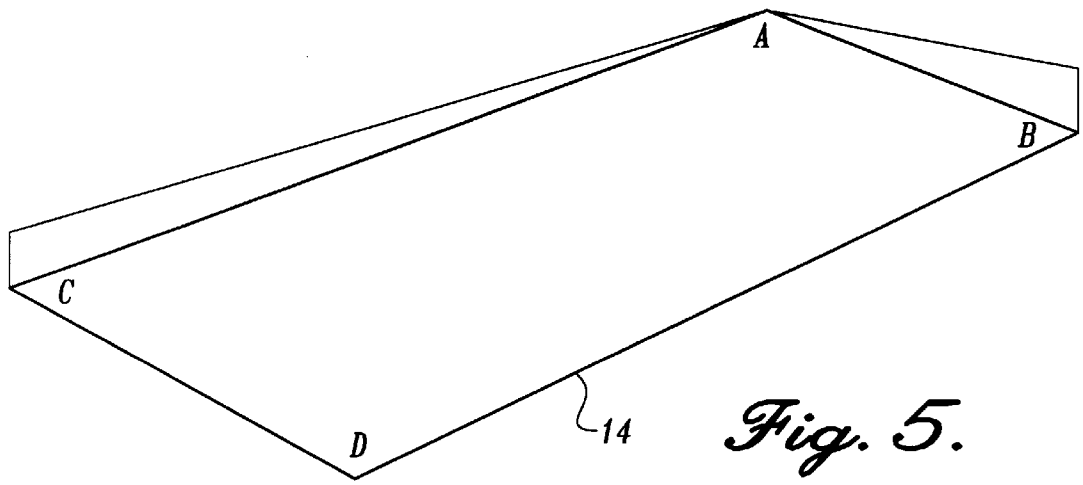
FIG. 5 is a schematic illustration of an initial position of a chassis plane measured in accordance with a preferred embodiment of the present invention.
Figure 6:
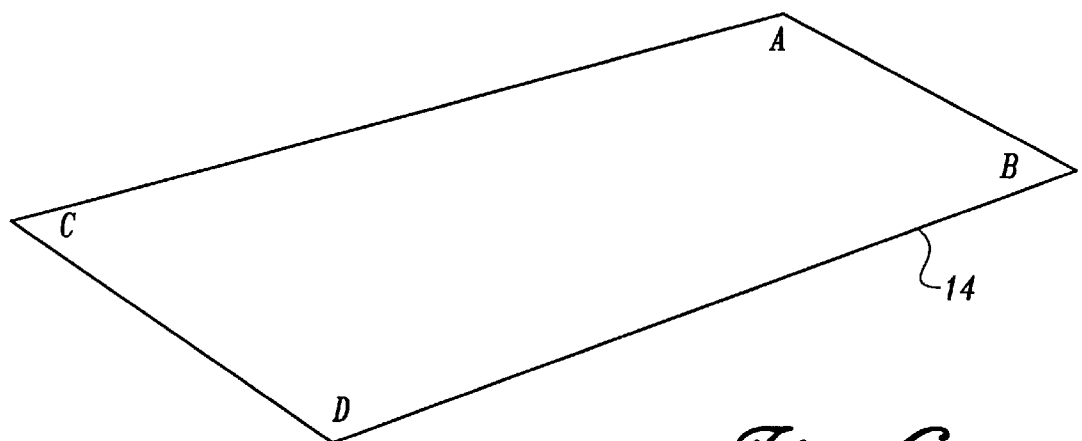
FIG. 6 is a schematic illustration of a chassis plane leveled in accordance with a preferred embodiment of the present invention.

For example, a chassis plane 14 is illustrated in FIG. 5 as a rectangle having four corners A, B, C, and D. Points A and C correspond to the locations along the first frame rail 24 where the jacks 12A and 12C are mounted, respectively. Similarly, points B and D in FIG. 5 correspond to the locations on the second frame rail 25 where the jacks 12B and D are mounted, respectively. It will be understood that the chassis plane may slope laterally from side-to-side, or longitudinally from front-to-rear as illustrated by the dashed lines in FIG. 5, or any combination thereof, depending on the terrain on which the vehicle is parked. In operation, the system identifies which side or point associated with the jacks is at the highest location relative to the others, and the remaining jacks are actuated to move the chassis plane into a level position relative to the initially highest point. If two or more of the jacks must be moved by the same distance to level the chassis plane, the jacks are provided with the same rate of fluid flow from the pump. However, as discussed previously, the frequency at which the solenoid valves are actuated, and the resulting rate of fluid flow, is proportional to the relative distance that each of the jacks must travel to level the vehicle. For example, if two jacks must be moved by the same distance, and a third jack must be moved twice as far as the first two, the first two jacks are provided with fluid at a first equal rate, while fluid is provided to the third jack at a second rate equal to twice that of the first rate. Therefore, the vehicle will be leveled by actuating three jacks in unison for a single length of time, although the third jack will move twice as quickly and therefore twice as far as the first two jacks. The chassis plane will thereafter be in a level position, as illustrated in FIG. 6.

A method and apparatus for automatically leveling a vehicle has been shown and described. From the foregoing, it will be appreciated that although embodiments of the invention have been described herein for purposes of illustration, various modifications may be made without deviating from the spirit of the invention. Thus, the present invention is not limited to the embodiments described herein, but rather is defined by the claims which follow.

The embodiments of the invention in which an exclusive property or privilege is claimed are defined as follows:

1. A system for automatically leveling a vehicle comprising:
    a plurality of leveling jacks coupled to a vehicle chassis, the vehicle chassis defining a plane;
    a manifold coupling a hydraulic pump in fluid communication with the leveling jacks;
    a plurality of solenoid valves in fluid communication with the manifold to selectively allow fluid to flow from the manifold to each of the leveling jacks;
    an electronic level sensor coupled to a central processing unit and to the solenoid valves, the electronic level sensor determining the location of the plane defined by the vehicle chassis and comparing the location of the plane defined by the vehicle chassis to a location of a level base plane; and
    wherein each of the solenoid valves operates at a frequency selected by the central processing unit to allow fluid to flow from the manifold to each of the leveling jacks at a rate selected to actuate the leveling jacks for a time interval and in such a manner that each of the leveling jacks reach a selected position at the end of the time interval to level the vehicle.

2. The system according to claim 1, wherein the frequency selected by the central processing unit is 4–10 cycles per second.

3. The system of claim 2, wherein the solenoid valves are configured to fully open and fully close during each cycle.

4. A system for automatically leveling a vehicle, comprising:
    a plurality of leveling jacks that are hydraulically actuated and that are coupled to a vehicle chassis, the vehicle chassis defining a plane;

a hydraulic pump coupled to a source of fluid;

a manifold coupled in fluid communication with the leveling jacks and with the hydraulic pump;

a plurality of solenoid valves coupled to the manifold, the solenoid valves selectively allowing fluid to flow to and from the leveling jacks;

a control panel coupled to an electronic motor/pump controller and to a central processing unit, the solenoid valves being electronically coupled to the electronic motor/pump controller, to the central processing unit, and to a digital level sensor, the digital level sensor determining the location of the plane defined by the vehicle chassis and comparing the location of the plane defined by the vehicle chassis to a location of a level base plane that is stored in the digital level sensor; and wherein each of the solenoid valves operates at a frequency selected by the central processing unit to allow fluid to flow from the manifold to each of the leveling jacks at a rate selected to actuate the leveling jacks for a time interval and in such a manner that the leveling jacks reach their selected positions substantially simultaneously.

5. The system according to claim 4, wherein the frequency selected by the central processing unit is 4–10 cycles per second.

6. The system of claim 5, wherein the solenoid valves are configured to fully open and fully close during each cycle.

7. A method of automatically leveling a vehicle comprising:

ensuring that a plurality of leveling jacks coupled to a vehicle are in contact with the ground;

determining a location of a plane defined by a chassis of the vehicle;

comparing the location of the plane defined by the chassis to a location of a level base plane;

determining a distance each of the leveling jacks must be moved relative to the other leveling jacks to cause the plane defined by the chassis to be in the location of the level base plane;

determining a frequency at which each of a plurality of solenoid valves coupled to an associated leveling jack and to a source of pressurized fluid must be actuated in order to move an associated leveling jack by the determined distance; and actuating the solenoid valves simultaneously at the determined frequencies.

8. The method according to claim 7, further comprising the step of actuating the solenoid valves at a frequency of 4–10 cycles per second.

9. The method according to claim 7, wherein the frequency at which the plurality of solenoid valves are actuated is selected so that the leveling jacks move by the determined distances during substantially the same time interval for each of the leveling jacks.

10. The method according to claim 7, further comprising the steps of:

manually leveling the vehicle;

measuring the location of the level base plane; and electronically storing the location of the level base plane.

* * * * *